United States Patent
Hoots et al.

(10) Patent No.: US 7,448,255 B2
(45) Date of Patent: Nov. 11, 2008

(54) VERY HIGH-TEMPERATURE FLUORESCENT TRACER AND AUTOMATION FOR BOILER WATER APPLICATIONS

(75) Inventors: John E. Hoots, Batavia, IL (US); Martin R. Godfrey, Naperville, IL (US)

(73) Assignee: Nalco Company, Naperville, IL (US)

( * ) Notice: Subject to any disclaimer, the term of this patent is extended or adjusted under 35 U.S.C. 154(b) by 201 days.

(21) Appl. No.: 11/427,497

(22) Filed: Jun. 29, 2006

(65) Prior Publication Data

US 2008/0000287 A1 Jan. 3, 2008

(51) Int. Cl.
*G01M 3/04* (2006.01)
(52) U.S. Cl. ....................................... 73/40.7
(58) Field of Classification Search ............... 73/40, 73/40.7, 49.2
See application file for complete search history.

(56) References Cited

U.S. PATENT DOCUMENTS

| | | | |
|---|---|---|---|
| 5,041,386 A | 8/1991 | Pierce et al. | 436/50 |
| 5,320,967 A | 6/1994 | Avallone et al. | 436/50 |
| 5,411,889 A | 5/1995 | Hoots et al. | |
| 5,435,969 A * | 7/1995 | Hoots et al. | 422/14 |
| 6,966,213 B2 | 11/2005 | Hoots et al. | |
| 2005/0025659 A1* | 2/2005 | Godfrey et al. | 422/1 |

OTHER PUBLICATIONS

Boyette et al., "An Automated Coordinated Phosphate/pH Controller for Industrial Boilers," Corrosion 95, the NACE International Annual Conference and Corrosion Show, 1995, No. 624, pp. 1-10.

Chagnard, Harold. "Automated Monitoring and Control of pH, Phosphate and Sodium to Phosphate Ratio in Boiler Systems Operating with Captive Alkalinity, An On-Line Monitoring and Control System for Coordinated Phosphate/pH Boiler Water Treatment Programs," 1996, IWC-52,53, pp. 513-514.

Hollander, Orin, "Online Control of Coordinated Phosphate Programs in High-Pressure Steam Generators," Materials Performance, 2000, pp. 76-80.

Huchler et al., "An On-Line Monitoring and Control System for Coordinated," 1996, ICW-53, pp. 499-506.

Rumelfanger et al., "Automated Monitoring and Control of pH, Phosphate and Sodium to Phosphate Ratio in Boiler Systems Operating with Captive Alkalinity," 1996, IWC-52, pp. 1-6.

* cited by examiner

*Primary Examiner*—Daniel S Larkin
(74) *Attorney, Agent, or Firm*—Peter A. DiMattia; Michael B. Martin

(57) ABSTRACT

A method of fluorometrically monitoring dose control and leak detection, as well as boiler water system programs that occur in industrial systems containing boilers that operate between about 1500 psig and 2600 psig, and at pH from about 7.6 to 11.5.

6 Claims, 3 Drawing Sheets

Continuum Phosphate Program

| System Conditions Leading to Stress | Possible Performance Problem | Tracer Level | Phosphate | pH | Cation Conductivity | Silica | Corrective Action |
|---|---|---|---|---|---|---|---|
| Low product dosage | Corrosion | -1 | -1 | +1* | 0 | 0 | Increase PO4 product dosage based on tracer |
| High product dosage | Scaling, Corrosion | +1 | +1 | -1* | 0 | 0 | Increase PO4 product dosage based on tracer |
| High Na:PO4 ratio | Scaling | 0 | ** | -1 | 0 | 0 | Decrease NaOH feedrate, Decrease feedrate of high Na:PO4 ratio product and/or increase feedrate of low Na:PO4 ratio product |
| Low Na:PO4 ratio | Corrosion | 0 | ** | -1 | 0 | 0 | Decrease NaOH feedrate, Decrease feedrate of high Na:PO4 ratio product and/or increase feedrate of low Na:PO4 ratio product |
| Sodium phosphate hideout | Scaling, Corrosion | 0 | -1 | +1 | 0 | 0 | Do not change PO4 product feedrate |
| Sodium phosphate re-dissolving | --- | 0 | +1 | -1 | 0 | 0 | Do not change PO4 product feedrate |
| Calcium phosphate precipitation | Scaling, Corrosion | 0 | -1 | -1* | 0 | 0 | Increase PO4 product feedrate |
| High pH | Scaling | 0 | 0 | +1 | +1 | 0 | Blowdown |
| Low pH | Corrosion | 0 | 0 | -1 | 0 | 0 | Add NaOH to increase pH |
| High Silica | Scaling | 0 | 0 | 0 | 0 | +1 | Blowdown |
| High cation conductivity | Turbine Damage | 0 | 0 | 0 | +1 | 0 | Fix mechanical or operational problem |
| Process leak | Scaling, Corrosion | 0*** | **** | **** | **** | 0 | Fix leak, pump, and/or condenser |

NOTE: 0 = no change, +1 = increase, and –1 = decrease

\* Usually
\*\* PO4 level depends on the feedrate of individual treatment products (PO4 level may increase, decrease or show no change)
\*\*\* Unless fluorescent interference occurs due to leak
\*\*\*\* Impact depends on the chemistry of the leak

FIG. 1

Continuum Phosphate Program

| System Conditions Leading to Stress | Possible Performance Problem | Tracer Level | Phosphate | pH | Cation Conductivity | Silica | Corrective Action |
|---|---|---|---|---|---|---|---|
| Low product dosage | Corrosion | -1 | -1 | +1* | 0 | 0 | Increase PO4 product dosage based on tracer |
| High product dosage | Scaling, Corrosion | +1 | +1 | -1* | 0 | 0 | Increase PO4 product dosage based on tracer |
| High Na:PO4 ratio | Scaling | 0 | ** | -1 | 0 | 0 | Decrease NaOH feedrate, Decrease feedrate of high Na:PO4 ratio product and/or increase feedrate of low Na:PO4 ratio product |
| Low Na:PO4 ratio | Corrosion | 0 | ** | -1 | 0 | 0 | Decrease NaOH feedrate, Decrease feedrate of high Na:PO4 ratio product and/or increase feedrate of low Na:PO4 ratio product |
| Sodium phosphate hideout | Scaling, Corrosion | 0 | -1 | +1 | 0 | 0 | Do not change PO4 product feedrate |
| Sodium phosphate re-dissolving | --- | 0 | +1 | -1 | 0 | 0 | Do not change PO4 product feedrate |
| Calcium phosphate precipitation | Scaling, Corrosion | 0 | -1 | -1* | 0 | 0 | Increase PO4 product feedrate |
| High pH | Scaling | 0 | 0 | +1 | +1 | 0 | Blowdown |
| Low pH | Corrosion | 0 | 0 | -1 | 0 | 0 | Add NaOH to increase pH |
| High Silica | Scaling | 0 | 0 | 0 | 0 | +1 | Blowdown |
| High cation conductivity | Turbine Damage | 0 | 0 | 0 | +1 | 0 | Fix mechanical or operational problem |
| Process leak | Scaling, Corrosion | 0*** | **** | **** | **** | 0 | Fix leak, pump, and/or condenser |

NOTE: 0 = no change, +1 = increase, and -1 = decrease

\* Usually
\*\* PO4 level depends on the feedrate of individual treatment products (PO4 level may increase, decrease or show no change)
\*\*\* Unless fluorescent interference occurs due to leak
\*\*\*\* Impact depends on the chemistry of the leak Drum Water Grab Sample Analysis –
Manual Dosage Control (Monitoring Only)

Phosphate Continuum Control Chart

Drum Water Grab Sample Analysis
Effect of Automatic Dosage Control

Combined Cycle Power Plant

VERY HIGH-TEMPERATURE FLUORESCENT TRACER AND AUTOMATION FOR BOILER WATER APPLICATIONS

FIELD OF THE INVENTION

This invention relates to fluorometrically monitoring and controlling boiler water systems that operate at very high pressure.

BACKGROUND

Boiler water systems are constantly subjected to stress during their operation. For example, corrosion and scaling are various types of stresses that impact the ability of a boiler water system to operate efficiently and safely. There are several boiler water treatment programs that are designed to combat these stresses.

Various types of chemicals are added to the boiler water system to relieve boiler water system stresses. Therefore, it is important to make sure an adequate amount of chemical(s) are added to the boiler water system. Over-feeding is also not desirable because of unwanted wastage of chemicals and chemical costs. One way of monitoring chemicals in a boiler water system is by fluorometrically monitoring an inert fluorescent tracer that is added to the boiler water system in known proportion to the chemical added to the boiler water system. This methodology is discussed in U.S. Pat. No. 5,041,386 issued to Hoots et al, which is herein incorporated by reference.

Leakage in a boiler water system also creates stress on the boiler water system. One way of monitoring leakage in a boiler water system is by fluorometrically monitoring an inert fluorescent tracer added to the boiler water system. This methodology is discussed in U.S. Pat. No. 5,320,967 issued to Hoots et al, which is herein incorporated by reference.

Several industrial processes, for example, electric utility plants, operate boiler water systems above 1500 psig. One of ordinary skill in the art would typically not apply the protocols described above in applications above 1500 psig because the fluorescent tracer is thought to be unstable and very likely to decompose into an organic acid that could corrode the boiler water system. Thus there is a need to bring the benefits of fluorometrically traced technology to industrial processes that require boiler water operation above 1500 psig.

SUMMARY OF THE INVENTION

The present invention provides a method for monitoring one or more chemicals in a boiler water system of an industrial process comprising the steps of: providing one or more fluorometers; providing a boiler water system; operating said boiler water system between 1500 and 2600 psig, and at a pH from about 7.6 to about 11.5; adding a known amount of one or more inert fluorescent tracers and a known amount of one or more chemicals to said industrial system, wherein said inert fluorescent tracers are selected from the group consisting of: naphthalene sulfonate and salts thereof, 1,5-naphthalenedisulfonic acid and salts thereof, anthracenedisulfonic acid salts, and a combination thereof; using said fluorometers to detect the fluorescence of said fluorescent tracers, wherein said fluorometers produce an output signal proportional to the detected fluorescence; correlating said output signal from said fluorometers to said concentration of said chemicals in said boiler water system; and optionally regulating the feed of said chemicals into said boiler water system based on the concentration of said chemicals.

The present invention also provides a method of monitoring leak detection in a boiler water system of an industrial process comprising: providing one or more fluorometers; providing a boiler water system; operating said boiler water system between 1500 and 2600 psig, and at pH from about 7.6 to 11.5; adding one or more inert tracers to said boiler water system, wherein said inert fluorescent tracers are selected from the group consisting of: naphthalene sulfonate and salts thereof, 1,5-naphthalenedisulfonic acid and salts thereof, anthracenedisulfonic acid salts, and a combination thereof; using said fluorometers to detect the fluorescence of said fluorescent tracers at one or more locations within said boiler water system and/or places adjacent to said boiler water system where said inert fluorescent tracers would not be expected; correlating the presence of said inert fluorescent tracers in said locations with leakage in said boiler water system; and optionally taking corrective action.

The present invention also provides a method of monitoring leak detection in a boiler water system of an industrial process comprising: providing a boiler water system; providing one or more fluorometers and locating said fluorometers in position to sample a water sample from a feed line of said boiler water system and a blowdown line of said boiler water system; providing one or more flow meters and locating said flowmeters in a feed line of said boiler water system and in a blowdown line of said boiler water system; operating said system between 1500 and 2600 psig, and at pH from about 7.6 to 11.5; adding one or more inert fluorescent tracers to said feed line of said boiler water system wherein said tracers are selected from the group consisting of: naphthalene sulfonate and salts thereof, 1,5-naphthalenedisulfonic acid and salts thereof, anthracenedisulfonic acid salts, and a combination thereof; using said fluorometers to detect the fluorescence of said inert fluorescent tracers at said feed line and said blowdown line and correlating that fluorescence with said concentration of said inert fluorescent tracers at said feed line and at said blowdown line; using said flowmeters to measure the flow of water at the feed line and blowdown line; comparing the change in the concentration of said inert fluorescent tracers from step f with the change in flow derived from step g; determining from that comparison whether there is a leak in said boiler water system; and optionally taking corrective action.

The present invention further provides a method of monitoring and controlling a boiler water system in an industrial process comprising: (a) providing a boiler water system; (b) providing one or more fluorometers, analytical devices, and a controller that are in communication with said boiler water system; (c) programming said fluorometers, controller, and analytical devices with planning information from a boiler water treatment program developed for said boiler water system; (d) operating said boiler water system from 1500 psig to 2600 psig, and at pH from about 7.6 to 11.5; (e) adding one or more inert fluorescent tracers to said boiler water system, wherein said inert fluorescent tracers are selected from the group consisting of: naphthalene sulfonate and salts thereof, 1,5-naphthalenedisulfonic acid and salts thereof, anthracenedisulfonic acid salts, and a combination thereof; (f) using said fluorometers and analytical devices to determine the status of system conditions leading to stress that are in accord with said boiler water treatment program, wherein said fluorometers at least monitor said inert fluorescent tracers; (g) determining the pattern of changes in the status of changes in the status of system conditions leading to stress from step (f) over time; comparing the changes in the status of system conditions leading to stress in steps (f) and step (g), with said developed boiler water treatment program to determine what corrective action(s) is/are recommended; using said controller to automatically implement what corrective action(s) is/are recommended.

BRIEF DESCRIPTION OF THE DRAWINGS

FIG. 1 illustrates one type of Continuum Phosphate Program that maybe implemented in boiler program.

DETAILED DESCRIPTION OF THE INVENTION

Figure 2:
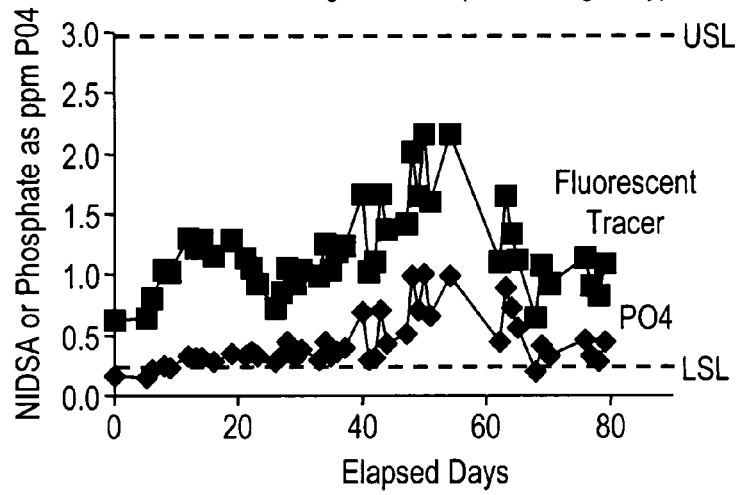
FIG. 2 shows $PO_4$ and 1,5 naphthalenedisulfonic acid readings, both in terms of ppm $PO_4$ over an eighty day period.

Definitions:

"Coordinated Phosphate Program" means a program to raise the pH of boiler water by adding phosphate instead of free hydroxide alkalinity. Trisodium phosphate or polyphosphate solutions with a sodium/phosphate ratio of about 3.0 may be used for this program.

"Congruent Phosphate Program" means a boiler internal treatment program where phosphate is used to adjust the pH of the boiler water. The sodium/phosphate ratio in the boiler water is usually maintained in the 2.3-2.6 range so that free caustic alkalinity does not appear during episodes of "phosphate hideout". Phosphate hideout sometimes occurs during times when boiler steam load is increasing when a phosphate salt with sodium to phosphate ratio near 2.85 temporarily precipitates from the boiler water.

"Equilibrium Phosphate Program" means a program that prevents phosphate hideout by keeping the phosphate concentration below the equilibrium solubility of phosphate during load increases for a given boiler. This normally results in a target phosphate concentration in the boiler water between 0.2 ppm and 2 ppm.

"Continuum Phosphate Program" is a terminology applied to a range of buffer phosphate treatments by the Electric Power Research Institute that limit the free hydroxide present in boiler water to less than 1 ppm NaOH.

"Inert fluorescent tracer" means a tracer that is not appreciably or significantly (+/−10%) affected by any other chemistry in the system, or by the other system parameters such as metallurgical composition, heat changes or heat content. There are invariably some background interferences, such as natural fluorescence in the feedwater, and in such circumstances the tracer dosage should be increased to overcome background interference, which, under classical analytical chemistry definitions, shall be less than 10%.

"$PO_4$" or "PO4" means phosphate in any of its forms.

"TSP" means trisodium phosphate.

"Naphthalene sulfonate and salts thereof" includes mono, di, and tri sulfonates, and any mixture thereof.

"NDSA" means naphthalene disulfonic acid, disodium salt.

"HRSG" means heat recovery steam generator.

"Na" means the element sodium found in phosphate salts and aqueous solutions as the sodium ion $Na^+$.

PREFERRED EMBODIMENTS

Dosage Control

As stated above, the present invention provides a method for monitoring one or more chemicals in a boiler water system of an industrial process, wherein the boiler water system operates between 1500 and 2600 psig, and at a pH from about 7.6 to about 11.5. In a preferred embodiment the boiler water system operates at a pH from about 8 to about 10.5. In a most preferred embodiment, the boiler water system operates at a pH from about 8.6 to about 10.2. In yet a further embodiment, the boiler water system operates at a saturated steam temperature from 596° F. to 674° F.

This monitoring method implements fluorescence as a tool to monitoring chemical(s) added to the boiler water system. Various other analytical techniques may be used in conjunction with this technique.

It is known in the art of fluorescent tracer technology to relate the fluorescent signal of a fluorescent tracer to the amount of fluorescent tracer present. Then by knowing the amount of fluorescent tracer present, the amount of chemical present can be calculated, because a known amount of a fluorescent tracer is always added to a known amount of chemical, thus making the proportional relationship between the fluorescent tracer and the chemical added known. The fluorometer produces an output signal proportional to the detected fluorescence. The detected fluorescence can then be correlated to the concentration of chemical present in the system or added to the system.

A controller may be programmed to respond to the output signal from the fluorometer and adjust the dosage of the fluorescent tracer(s) and chemical(s) based on the output signal from the fluorescent tracer(s) detected by the fluorometer(s). The controller is in communication with feed mechanisms', for example, feed pumps, which control the dosage of chemical(s) and fluorescent tracers. The controller may also be in communication with other equipment that is associated with dosage control.

The controller may implement one or more types of responses, which may include: (1) the addition of more chemical(s) and tracer; (2) no action is taken; (3) corrective addition; and (4) blowdown.

The fluorescent tracers that are utilized must be inert. In one embodiment, it is preferred that the inert fluorescent tracer(s) of the present invention meet the following criteria: a) substantially foreign to the chemical species that are normally present in the water of the industrial water system in which the inert fluorescent tracer(s) may be used; b) substantially impervious to interference from, or biasing by, the chemical species that are normally present in the water of the industrial water system in which the inert tracer(s) may be used; c) compatible with all chemical(s) added to the water of the industrial water system in which the inert fluorescent tracer(s) may be used, and thus in no way reduce the efficacy thereof; d) compatible with all components of its formulation; and e) relatively nontoxic and environmentally safe, not only within the environs of the industrial water system in which it may be used, but also upon discharge therefrom.

It should be appreciated that the amount of inert fluorescent tracer(s) to be added to the boiler water system that is effective without being grossly excessive can vary with respect to a variety of factors including, without limitation, the monitoring method selected, the extent of background interference associated with the selected monitoring method, the magnitude of the expected inert fluorescent tracer(s) concentration in the industrial water system, the monitoring mode (such as, an on-line continuous monitoring mode), and other similar factors. In one embodiment, the amount of inert fluorescent tracer(s) added to said industrial water system ranges from about 5 ppt to about 1000 ppm, preferably from about 1 ppb to about 50 ppm, and more preferably from about 5 ppb to about 100 ppb.

The inert fluorescent tracer(s) that are utilized for dosage control are selected from the group consisting of: naphthalene sulfonate and salts thereof, 1,5-naphthalenedisulfonic acid and salts thereof, anthracenedisulfonic acid salts, and a combination thereof. Under the above-mentioned conditions, these inert fluorescent tracers are sufficiently stable and therefore are capable of being monitored.

The type of fluorometer utilized to carry out the protocol for this invention is known to those of ordinary skill in the art and may include a solid-state fluorometer. The fluorometer utilized to monitor fluorescence is programmed and configured to monitor a particular inert fluorescent tracer(s), which are added to the industrial water system; the fluorometer is programmed to monitor a particular inert fluorescent tracer(s) at a desired wavelength or range of wavelengths.

The fluorometer may be placed at various locations within the industrial systems known to those of ordinary skill in the art, for e.g. the boiler feed line.

The prescribed inert fluorescent tracer(s) may be added alone, or as a formulation containing an inert tracer and the desired chemical species to be monitored.

In an embodiment, inert fluorescent tracer(s) monitoring of the present invention can be conducted on a singular, intermittent or semi-continuous basis, and preferably the concentration determination of the inert fluorescent tracer(s) in the boiler water system is conducted on-site to provide a rapid real-time determination.

In another embodiment, the inert fluorescent tracer(s) can be added to a boiler water system as a component of a formulation, rather than as a separate component, such as a dry solid or neat liquid. The inert fluorescent tracer(s) formulation or product may include an aqueous solution or other substantially homogeneous mixture that disperses with reasonable rapidity in the industrial water system to which it is added. In this regard, the fluorescent tracer(s) concentration may be correlated to the concentration of a product.

In another embodiment the industrial processes are selected from the group consisting of: electric utilities, chemical process industry; oil production; oil refining; paper making; cogeneration of steam and electric power; and food processing.

Leak Detection

As stated above, leak detection can be monitored by comparing the change in flowrate and change of the concentration of an inert fluorescent tracer or by looking to see if the presence of an inert fluorescent tracer appears in a location within a boiler water system and/or adjacent to a boiler water system where the inert fluorescent tracer should not be present. Specifically, leak detection of the present invention occurs in a high pressure boiler water system of an industrial process that operates from 1500 psig to 2600 psig, and at pH from about 7.6 to 11.5. In a preferred embodiment the boiler water system operates at a pH from about 8 to about 10.5. In a most preferred embodiment, the boiler water system operates at a pH from about 8.6 to about 10.2. In yet a further embodiment, the boiler water system operates at a saturated steam temperature from 596° F. to 674° F.

This monitoring method implements fluorescence as a tool to monitoring leak(s) in a boiler water system of an industrial process. Various other analytical techniques may be used in conjunction with this technique.

In one embodiment, fluorometers may be placed at various locations within the boiler water system and/or places adjacent to said boiler system, specifically, in areas where inert fluorescent tracers should not be present. For example, you would not expect inert fluorescent tracers in the following locations: a steam line, a condenser, and cooling water. An inert fluorescent tracer is then added to the system.

In another embodiment, a known amount of inert fluorescent tracer is added to the boiler water system via a feed line. The flow rate of water entering the boiler water system and exiting the system is measured with a flowmeter. A fluorometer measures the fluorescence of the inert fluorescent tracer. The output signal can then be correlated with the amount of tracer exiting the system. The change in flowrate and change in the concentration can be compared with one another to see if there is a leak in said boiler water system. A divergence from the change in said concentration of inert fluorescent tracer(s) and said change in flowrate, would be indicative of a leak in the boiler water system. In one embodiment a controller, which receives input from said flowmeter and fluorometer (which can be correlated with concentration) may implement a desired protocol when the divergence occurs, which can include the following sounding: an alarm, and pressure release in the boiler water system.

The fluorometers and flowmeters of the present invention may be programmed and configured by one of ordinary skill in the art.

The fluorescent tracer(s) that are utilized must be inert. In one embodiment, it is preferred that the inert fluorescent tracer(s) of the present invention meet the following criteria: a) substantially foreign to the chemical species that are normally present in the water of the industrial water system in which the inert fluorescent tracer(s) may be used; b) substantially impervious to interference from, or biasing by, the chemical species that are normally present in the water of the industrial water system in which the inert tracer(s) may be used; c) compatible with all chemicals added to the water of the industrial water system in which the inert fluorescent tracer(s) may be used, and thus in no way reduce the efficacy thereof; d) compatible with all components of its formulation; and e) relatively nontoxic and environmentally safe, not only within the environs of the industrial water system in which it may be used, but also upon discharge therefrom.

It should be appreciated that the amount of inert fluorescent tracer(s) to be added to the boiler water system that is effective without being grossly excessive can vary with respect to a variety of factors including, without limitation, the monitoring method selected, the extent of background interference associated with the selected monitoring method, the magnitude of the expected inert fluorescent tracer(s) concentration in the industrial water system, the monitoring mode (such as, an on-line continuous monitoring mode), and other similar factors. In one embodiment, the amount of tracer(s) added to said industrial water system ranges from about 5 ppt to about 1000 ppm, preferably from about 1 ppb to about 50 ppm, and more preferably from about 5 ppb to about 100 ppb.

The inert fluorescent tracer(s) that are utilized for leak detection are selected from the group consisting of: naphthalene sulfonate and salts thereof, 1,5-naphthalenedisulfonic acid and salts thereof, anthracenedisulfonic acid salts, and a combination thereof. Under the above-mentioned conditions, these inert tracers are sufficiently stable and therefore are capable of being monitored.

In one embodiment, inert fluorescent tracer(s) monitoring of the present invention can be conducted on a singular, intermittent or semi-continuous basis.

The type of fluorometer utilized to carry out the protocol for this invention is known to those of ordinary skill in the art and may include a solid-state fluorometer. The fluorometer utilized to monitor fluorescence is programmed and configured to monitor a particular inert tracer(s), which are added to the industrial water system; the fluorometer is programmed to monitor a particular inert fluorescent tracer at a desired wavelength or range of wavelengths.

Once a leak is detected in the boiler water system, appropriate action can than be taken. A controller receiving an output signal from said fluorometers may execute a programmed action based upon said output signal. Execution may include sounding an alarm, shutting the boiler water system down, or releasing pressure in the boiler water system. An operator receiving input on-site or off-site may take action by manual means or by electronic means.

Boiler Water Treatment Programs

As stated above, a method of monitoring and controlling a boiler water system in an industrial process is disclosed. Various boiler water treatment programs are known in the art or can be created by one of ordinary skill in the art. The objectives of the program dictate how a program is defined and implemented.

In one embodiment, the boiler water treatment program is selected from the group consisting of: a Continuum Phosphate Program; a Buffer Phosphate Program; an Equilibrium Phosphate Program; and a Congruent Phosphate Program. One of ordinary skill in the art would know what these programs entail.

A boiler water treatment program, including the ones described above, may be implemented by of ordinary skill in the art. One of ordinary skill in the art would know how to configure and program the analytical instrumentation and controller, as well as the devices receiving said instructions from said controller so that the boiler water treatment program may be executed. The controller, for example, may be in communication with valves that control blowdown, pH meters, and feeding pumps.

In another embodiment, the boiler water treatment program includes: analysis of water chemistry parameters that include pH, phosphate or treatment actives; control of water blowdown; and chemical addition to said boiler system.

As shown in FIG. 1, a Continuum Phosphate Program is developed and programmed into analytical instrumentation such as pH meters, conductivity meters, and fluorometers, as well as a controller that is communication with said boiler water system. The program seeks to prevent corrosion and scaling due to a myriad of system factors. Corrective actions such an increasing/decreasing dosage of phosphate product addition, increasing/decreasing NaOH feedrate, blowing down said boiler water system, fixing mechanical/operational problems; and fixing leaks, pumps and/or condensers are carried out in view of a change in system conditions such as pH, conductivity, and inert fluorescent tracer levels.

In another embodiment, the chemical addition is monitored and controlled by monitoring fluorescence of an inert tracer added to the boiler water system in a manner as described above.

The following examples are not to be construed as limiting. The purpose of the examples is to illustrate how fluorescent based monitoring was carried out for high-pressure boiler water systems.

EXAMPLES

Example 1

Midwest Coal-Fired Base-Loaded Utility Power Plant

Here is an example of the use of 1,5 naphthalenedisulfonic acid, disodium salt at a coal-fired power plant. The 1,5 naphthalenedisulfonic acid was applied to the high-pressure steam generator operating at 2000 psig (636° F.). The 1,5 naphthalenedisulfonic acid, disodium salt was added in combination with sodium/phosphate-based program. The treatment was supplied to the boiler by diluting a liquid product in a daytank and pumping the resulting dilute solution into the chemical injection line in the steam drum of the boiler. Sodium hydroxide was added to the tank as needed to control boiler pH. The liquid product contained sodium tripolyphosphate and disodium naphthalene disulfonic acid dissolved in deionized water. The mass ratio of sodium tripolyphosphate to disodium naphthalene disulfonic acid in the liquid product was 28:1. The tripolyphosphate ion hydrolyses immediately in the high temperature boiler conditions to produce orthophosphate ion $PO_4$. The orthophosphate ion was analyzed by various wet chemistry and spectroscopic techniques in the boiler water. The fluorometers measuring the naphthalene disulfonic acid fluorescence were calibrated to read directly in ppm orthophosphate based on the ratio of sodium tripolyphosphate to disodium naphthalene disulfonic acid in the liquid product. This fluorometer calibration allowed for a direct comparison of the data from the orthophosphate tests and the fluorometric readings. If the orthophosphate test data differed from the fluorometric readings that would be evidence of a chemical reaction that had changed the ratio of phosphate to fluorophore in the boiler water as compared to the ratio found in the original liquid product injected into the boiler. FIG. 2 shows the 1,5 naphthalenedisulfonic acid, disodium salt and $PO_4$ readings, both in terms of ppm $PO_4$ over eighty day time period.

Boiler water blowdown samples were analyzed for $PO_4$ dosage, 1,5 naphthalenedisulfonic acid, and any evidence of 1,5 naphthalenedisulfonic acid, disodium salt degradation by chromatography (for trace amounts of organic acids and by-products formed due to any changes in original chemistry). No evidence was detected for decomposition of the fluorescent tracer. FIG. 2 shows comparison of 1,5 naphthalenedisulfonic acid, disodium salt and $PO_4$ analyses. Fluorescent tracer dosages were consistently higher than the $PO_4$ readings. This indicates a reaction that consumes $PO_4$ was occurring in the boiler system. This reaction is most likely the precipitation of a calcium phosphate salt caused by a small cooling water leak into the steam condenser in the utility cycle. Such leaks are not uncommon and often make the control of boiler water chemistry difficult. The difficulty of manual control is illustrated here since $PO_4$ and 1,5 naphthalenedisulfonic acid, disodium salt dosage is highly variable and $PO_4$ level is frequently near or below the lower specification limit ("LSL").

Figure 3:
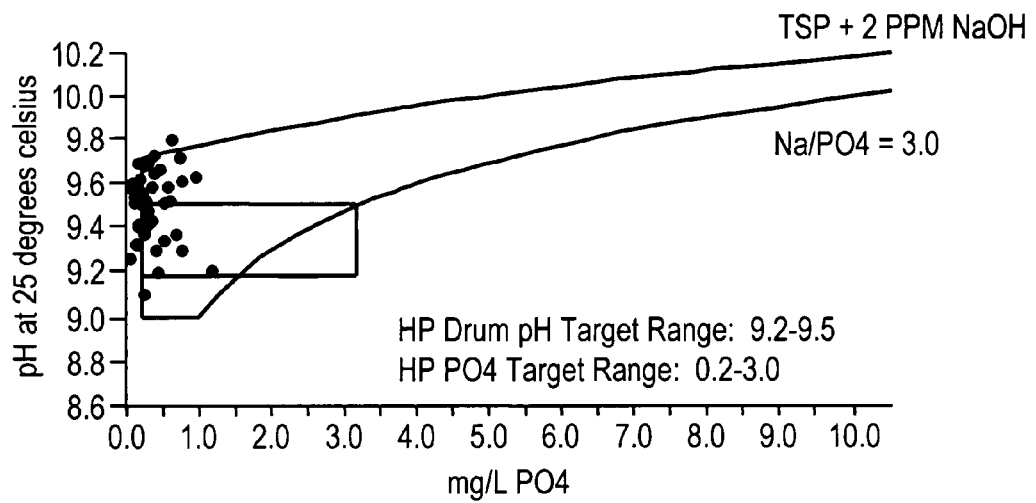
FIG. 3 shows observed results for $PO_4$ and pH vs. recommended control ranges at a power plant.

FIG. 3 also shows observed results for $PO_4$ and pH at the power plant. The control box for this specific location is within the rectangle. As indicated in FIG. 3, $PO_4$ dosage is frequently near or below the lower $PO_4$ dosage limit (0.2 ppm $PO_4$ at left-hand border of rectangle). Further, pH is frequently higher than the upper control range (pH 9.5 at top border of rectangular box). The results consistently indicate a need for better system control at this location.

Figure 4:
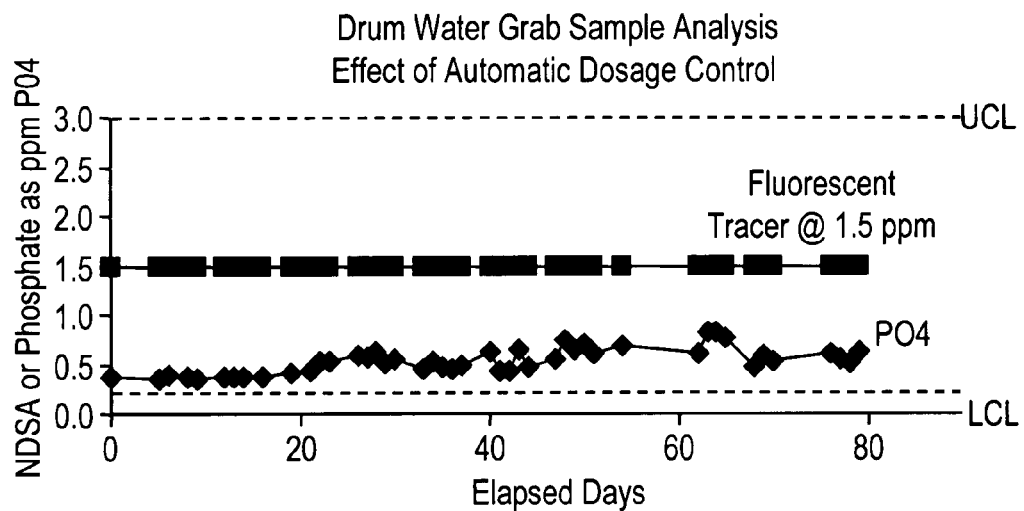
FIG. 4 shows what the impact would be of controlling treatment product dosage.

FIG. 4 shows what the impact would be of controlling treatment product dosage based inert fluorescent tracer at dosage equivalent to 1.5 ppm $PO_4$. $PO_4$ dosage is much less variable and low dosages of $PO_4$ (near or below LSL) are avoided. $PO_4$ dosage could be shifted closer to center of $PO_4$ dosage control range by further increasing product dosage setpoint (to >1.5 ppm) based on fluorescent tracer control.

Further, percent consumption of $PO_4$ can be observed based on the difference between $PO_4$ readings and fluorescent tracer readings. $PO_4$ consumption ranges from 45-77% in Example 1. Changes in percent consumption of $PO_4$ can indicate changes in boiler system operation (e.g., changes in the rate at which phosphate is consumed by precipitation with calcium delivered to the system by a small cooling water leak in the steam condenser. Refer to control matrix chart (FIG. 1) for the impact of boiler operating conditions on consumption of treatment chemicals such as $PO_4$.

Example 2

Midwest Gas-Fired Utility Power Plant

Figure 5:
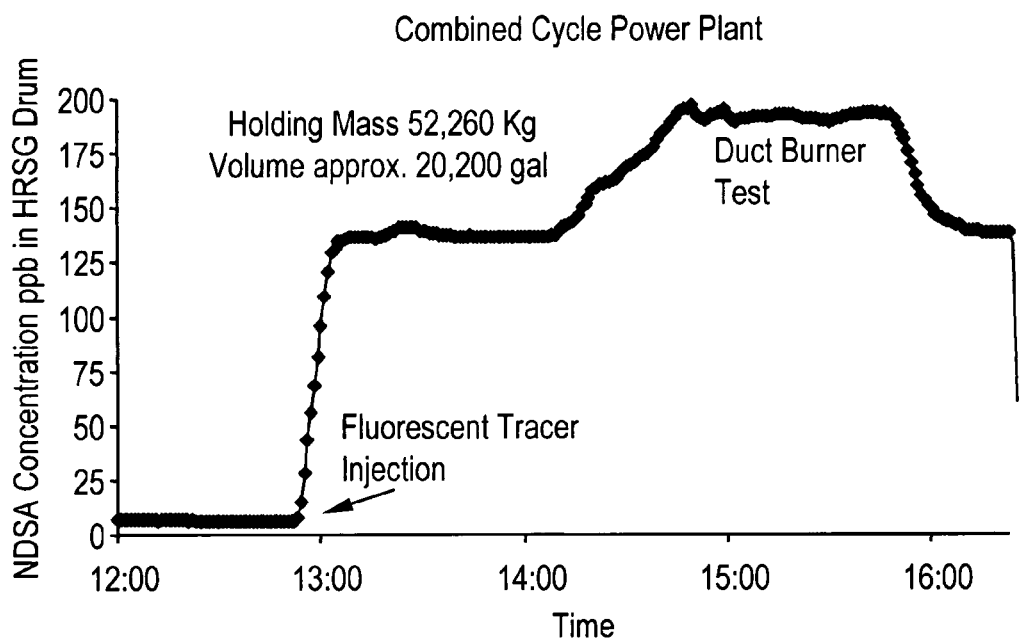
FIG. 5 shows data from a duct burner test.

Here is an example of the use of 1,5 naphthalene disulfonic acid disodium salt at a combined cycle electric generation facility. The inert fluorescent tracer was applied to the high-pressure section of a heat recovery steam generator in a combined cycle power plant. The inert fluorescent tracer was added as a slug to the system, which allowed the calculation of the operating volume of the boiler system. A duct burner test followed the addition of the inert fluorescent tracer. The plant operates in a sliding pressure mode. When only the gas turbine is in operation the high-pressure section of the heat recovery steam generator operates at about 1500 psig and 596° F. When natural gas duct burners are used to add additional heat to the gas turbine exhaust gas before it enters the heat recovery steam generator the operational pressure and temperature of the steam generator increases. At full duct burner firing the boiler operates at 2400 psig and about 663° F. As temperature of the boiler water increases its density decreases. As the heat transfer rate increases the proportion of gaseous steam to liquid water in the steam generator increases. The density and gaseous steam percentage change lead to a concentration increase for dissolved salts such as the inert fluorescent tracer when the pressure of the boiler rises. In the data shown in FIG. 5, a duct burner test is shown where the boiler pressure changes from 1500 psig to 2400 psig then returns to 1500 psig after two hours. The concentration of 1,5 naphthalenedisulfonic acid, disodium salt in the system is identical before and after the duct burner test showing that the compound was stable at 2400 psig during the two hour test.

What we claim is:

1. A method for monitoring one or more chemicals in a boiler water system of an industrial process comprising the steps of:
    a. providing one or more fluorometers;
    b. providing a boiler water system;
    c. operating said boiler water system between 1500 and 2600 psig, at a saturated steam temperature from 596° F. to 674° F., and at a pH from about 7.6 to about 11.5;
    d. adding a known amount of one or more inert fluorescent tracers and a known amount of one or more chemicals to said industrial system, wherein said inert fluorescent tracers are selected from the group consisting of: naphthalene sulfonate and salts thereof, 1,5-naphthalenedisulfonic acid and salts thereof, anthracenedisulfonic acid salts, and a combination thereof;
    e. using said fluorometers to detect the fluorescence of said fluorescent tracers, wherein said fluorometers produce an output signal proportional to the detected fluorescence;
    f. correlating said output signal from said fluorometers to said concentration of said chemicals in said boiler water system; and optionally
    g. regulating the feed of said chemicals into said boiler water system based on the concentration of said chemicals.

2. The method of claim 1 wherein said boiler water system operates at a pH from about 8 to 10.5.

3. The method of claim 1 wherein said boiler water system operates at a pH from about 8.6 to 10.2.

4. The method of claim 1 wherein said industrial process is selected from the group consisting of: electric utilities; chemical process industry; oil production; oil refining; paper making; cogeneration of steam and electric power, and food processing.

5. The method of claim 1 wherein said method is carried out as a batch or on-line process.

6. The method of claim 1 further comprising a controller, wherein said controller receives said output signal from said fluorometer and implements corrective action.

* * * * *